United States Patent [19]
Schumacher

[11] Patent Number: 5,992,456
[45] Date of Patent: Nov. 30, 1999

[54] COUPLING SLEEVE FOR A HYDRAULIC COUPLING FOR RECEIVING DIFFERENT COUPLING PLUGS

[76] Inventor: Gustav Schumacher, Gartenstrasse 8, 57612 Eichelhardt, Eichelhardt, Germany

[21] Appl. No.: 08/948,850

[22] Filed: Oct. 10, 1997

[30] Foreign Application Priority Data

Oct. 12, 1996 [DE] Germany ............................ 196 42 236

[51] Int. Cl.⁶ ..................................................... F16L 37/28
[52] U.S. Cl. .................... 137/614.05; 137/614; 137/269; 285/914
[58] Field of Search .......................... 251/149.6; 137/269, 137/614.04, 614.05, 614; 285/914

[56] References Cited

U.S. PATENT DOCUMENTS

| | | | |
|---|---|---|---|
| 3,170,667 | 2/1965 | Szohatzky | 251/149.6 |
| 5,167,398 | 12/1992 | Wade et al. | 251/149.6 |
| 5,294,092 | 3/1994 | Wade et al. | 251/149.6 |

FOREIGN PATENT DOCUMENTS 42 03 417 A1   8/1992   Germany.

*Primary Examiner*—A. Michael Chambers
*Attorney, Agent, or Firm*—Harness, Dickey & Pierce, P.L.C.

[57] ABSTRACT

A coupling sleeve (2) for receiving a coupling plug (20, 20'), which two parts, together, form a hydraulic coupling and serve to connect two hydraulic pipes. The coupling sleeve (2) has a housing (1) and a receiving chamber (4) to receive and secure a coupling plug (20, 20'). The housing (1) is associated with a valve (5). The valve (5) is operated from the outside and can be transferred into an open position to establish a connection with the receiving chamber (4). The receiving chamber (4) is associated with a sealing member to achieve a sealing effect relative to the coupling plug. The receiving chamber is designed to receive, alternatively, at least two different coupling plugs. For this purpose, the receiving chamber is provided with separate sealing elements (13, 14). Each sealing element (13, 14) serves to seal only one of the different coupling plugs. Thus, depending on the design of the coupling plug, a different sealing member becomes effective. This achieves an easy coupling operation.

6 Claims, 2 Drawing Sheets

COUPLING SLEEVE FOR A HYDRAULIC COUPLING FOR RECEIVING DIFFERENT COUPLING PLUGS

BACKGROUND OF THE INVENTION

The invention relates to a coupling sleeve for receiving a coupling plug. The two parts, together, form a hydraulic coupling and serve to connect two hydraulic pipes. The coupling sleeve is connected to a housing and includes a receiving chamber which secures and receives a coupling plug. The housing is associated with a valve. The valve establishes a connection with the receiving chamber and can be transferred into an open position. The receiving chamber is associated with sealing means to achieve a sealing effect relative to the coupling plug.

A hydraulic coupling with a coupling sleeve is described in DE 43 18 840 C2. The coupling has a switching pin which axially projects into the receiving chamber of the coupling sleeve and penetrates same when the coupling is switched into the open position. A manual lever is provided to open the coupling, with the housing which is connected to the coupling sleeve. The lever, via further elements, mechanically displaces the switching pin in the axial direction. The receiving chamber of the coupling sleeve is designed such that both a standard plug according to ISO 5675 and SAE-J 1036 and a special flat valve plug can be coupled and then opened by the switching pin. The flat valve plug is a plug which includes an end face which is planar and is arranged close to the bore end of the receiving chamber and also close to the end face of the valve. The flat valve plug is advantageous during uncoupling the coupling plug from the coupling sleeve in that any leakages are kept to a minimum. Even when using a standardized plug according to the above-mentioned standards, the oil leakage rate is still smaller than in cases where the valve is moved into the open position by inserting the coupling plug. In particular, such hydraulic couplings are used in agricultural machinery or in mobile hydraulic systems. Therefore the coupling sleeve has to be designed such that both standard plugs, and specially adapted plugs, with flush contact conditions, can be used to reduce the oil leakage rate. However, the disadvantage of the above design is that only one sealing assembly is selected for sealing the different types of coupling plugs. This means that, for example, plugs which provide a flat contact, e.g. whose end face is moved close to the end face of the receiving chamber and thus close to the valve, as a result of the compression of the enclosed air, are difficult to insert before establishing contact, e.g. before their end face rests against the end face of the receiving chamber.

SUMMARY OF THE INVENTION

It is an object of the invention to provide a coupling sleeve which simply and easily couples different types of coupling plugs while still achieving a leakproof connection.

In accordance with the invention, the receiving chamber is designed to receive, alternatively, at least two different coupling plugs. The chamber includes a separate sealing element in the form of a sealing means for each coupling plug. The sealing means has a sealing effect relative to only one of the different coupling plugs.

With such an assembly, the one seal only carries out its sealing function if a coupling plug is provided which, by means of its end face, closely rests against the end face of the receiving chamber. The other seal only has a sealing effect if, for example, a standard plug is inserted into the chamber and the plug whose end face is held at a distance from the end face of the receiving chamber in the coupled condition.

The sealing element which serves to seal a coupling plug whose end face closely rests against the end face of the receiving chamber is preferably arranged near the face to keep the space in front of the seal as small as possible. The closeness prevents any enclosed air from compressing when inserting the coupling plug. In the case of standard plugs, the end face in any case is arranged at a distance from the end face of the receiving chamber. This creates a larger free space because a projection of a length of approximately 4 mm projects beyond the end face of the receiving chamber. Thus, in the case of such standard plugs, the sealing element can be arranged at a greater distance from the end face of the receiving chamber because sufficient space is available to prevent any special compression pressure from building up between the end face of the receiving chamber and the end face of the coupling plug when inserting the coupling plug.

According to a further embodiment of the invention, the sealing elements are provided in the form of sealing rings. The receiving chamber includes axially spaced receiving grooves to receive the sealing elements. The sealing elements act on different diameters because the receiving grooves provided in the receiving chamber have different diameters. The coupling plugs can be secured relative to the coupling sleeve in two different ways. On the one hand, it is possible to associate the coupling sleeve with a setting bush which loads the engaging balls which engage a matching engaging groove of the coupling plug. Alternatively, it is possible to provide the coupling sleeve with a thread and secure the coupling plug thereto by means of a union nut.

From the following detailed description, taken in conjunction with the drawings and subjoined claims, other objects and advantages of the present invention will become apparent to those skilled in the art.

BRIEF DESCRIPTION OF THE DRAWINGS

A preferred embodiment of the coupling sleeve is diagrammatically illustrated in the drawing wherein.

DETAILED DESCRIPTION OF THE DRAWINGS

Figure 1:
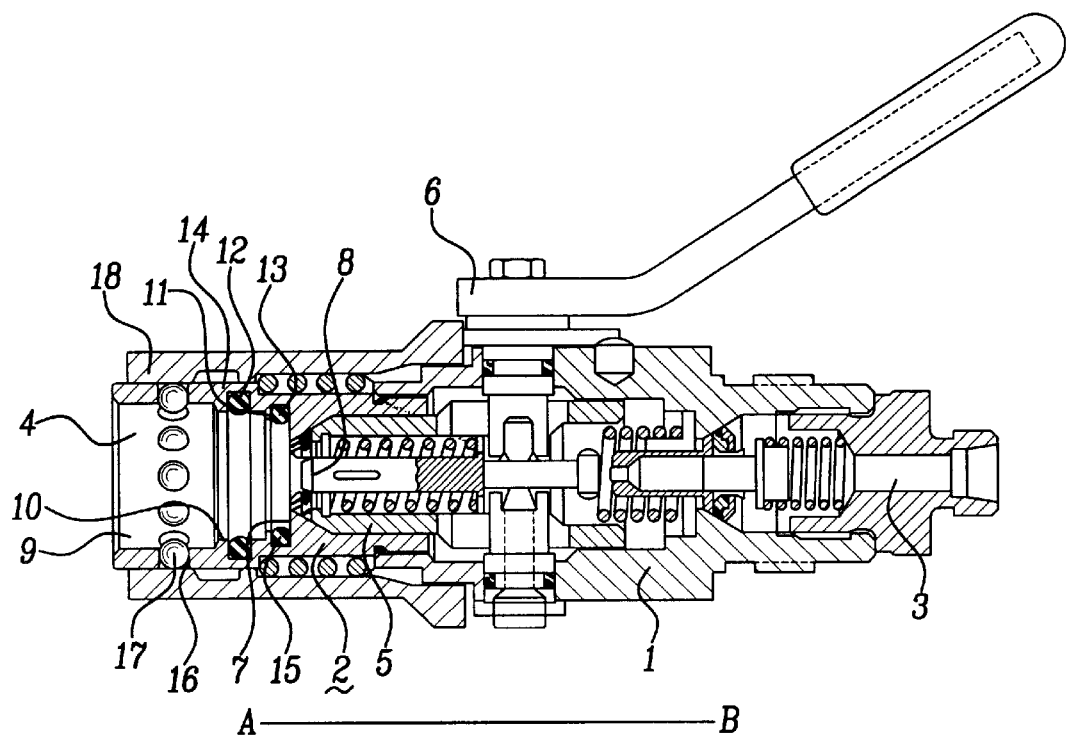
FIG. 1 is a cross-sectional view of a coupling sleeve in the form of an individual component whose housing is associated with a valve, with the valve being closed.

FIG. 1 illustrates the coupling sleeve 2 with a housing 1 defining a longitudinal axis 3. The coupling sleeve 2 includes a receiving chamber 4 which is centered on the longitudinal axis 3. The receiving chamber is open towards one end face. The coupling sleeve 2 includes a valve 5 which, by manual operating means 6, is transferrable between a closed and open position.

The receiving chamber 4 includes an end face 7 which is arranged close to the valve 5. With the valve 5 in the open position, a connection to enable the passage of the pressure agent is established.

A switching pin 8 is connected to the actuating means 6. The switching pin 8 opens a valve of the coupling plug to be inserted into the receiving chamber. The switching pin 8 is moved into the open position so that the pressure agent can be exchanged through the hydraulic coupling as a whole.

A first bore step 9 is provided in the receiving chamber. The bore step 9 has a greater diameter towards the end face 7 and is followed by a second bore step 10 with a reduced diameter. The second bore step 10 is followed by a third bore step 11 whose diameter is reduced once again. A first receiving groove 12 is arranged on the longitudinal axis 3. The receiving groove 12 is offset by a greater distance from the end face 7 of the receiving chamber 4 and is engaged by a first sealing ring 14. The first receiving groove 12 and thus the first sealing ring 14 are positioned in the second bore step 10. A second receiving groove 13, which serves to receive the second sealing ring 15, is offset from the second bore step 10 and located in the third bore step 11, preferably so as to directly adjoin the end face 7.

Apertures 16 are arranged in a radial plane in the first bore step 9 of the receiving chamber 4. The apertures 16 are circumferentially distributed around the longitudinal axis 3. The apertures 16 open towards the receiving chamber 4 and towards the outer face of the housing 1 with engaging balls 17 being radially movably inserted into said apertures 16. The engaging balls 17 are loaded by a setting bush 18 which is settable in the setting directions A and B and which, in the position as drawn, holds the engaging balls 17 to prevent the balls 17 from escaping radially out of the sleeve 2. The drawing shows the closed position of the coupling sleeve 2. The setting bush 18 can be moved manually into a position which is displaced towards the left and in which the engaging balls are able to escape radially outwardly in order to enter an annular recess in the setting bush 18. The movement enables a coupling plug, for example in the form of the coupling plug 20 illustrated in FIG. 2, to be inserted into the receiving chamber 4.

The coupling plug 20 is a so-called flat plug whose end face 21 extends as far as the end face 7 of the receiving chamber 4. The plug end face 21 is positioned directly opposite the opening of the valve 5 in the open position. The coupling plug 20 includes a first outer face 24 in which there is arranged an engaging groove 23. The engaging groove 23, in the coupled position, overlaps with the engaging balls 17. Thus, the balls 17 enter the engaging groove 23 to secure the coupling plug 20 relative to the coupling sleeve 2. The first outer face 24 is followed in direction B by a second outer face 25 with a reduced diameter. The diameter of the second outer face 25 is adapted to the diameter of the third bore step 11. The third bore step 11 is the bore step with the smallest diameter and thus receives the second outer face 25. The second outer face 25 contacts the second sealing ring 15 and has a sealing effect relative to the second outer face 25. The end face 21 of the coupling plug 20 rests against the end face 7.

Figure 3:
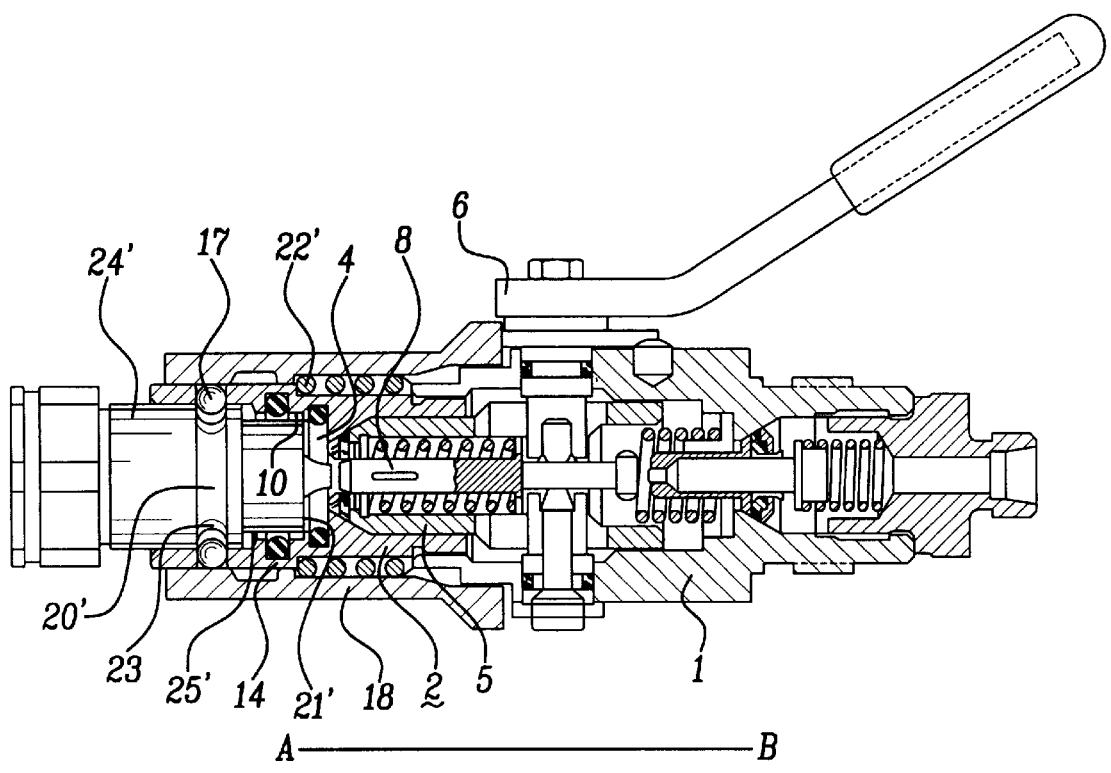
FIG. 3 is a cross-sectional view of a coupling plug in the form of a standard plug with a projection projecting beyond its end face associated with the coupling sleeve.

FIG. 3 is a second version of a coupling plug 20' in the coupled condition relative to the coupling sleeve 2. The second coupling plug 20' has a first outer face 24' which corresponds to that of the first coupling plug 20. The first outer face 24' is also received in the first bore step 9. The first outer face 24' also includes an engaging groove 23' in which, in the coupling condition as drawn, the engaging balls 17 are engaged and held in this position by the setting bush 18. The first outer face 24' is followed by a second outer face 25' comprising an end face 21' which ends in front of the second sealing ring 15. The second outer face 25' has a diameter which is greater than that of the second outer face of the coupling plug 20'. Thus, the second outer face 25' diameter is adapted to the second bore step 10 so that the first sealing ring 14 seals the receiving chamber 4 relative to the coupling plug 20'. A projection 22' of the valve of the coupling plug 20' projects beyond the end face 21'. The projection 22' is loaded by the switching pin 8. The switching pin 8 is actuated by actuating means 6, the coupling sleeve 2, in the opening direction when the coupling plug 20' is in the coupled condition relative to the coupling sleeve 2, enables a hydraulic medium to flow through the hydraulic coupling.

Figure 2:
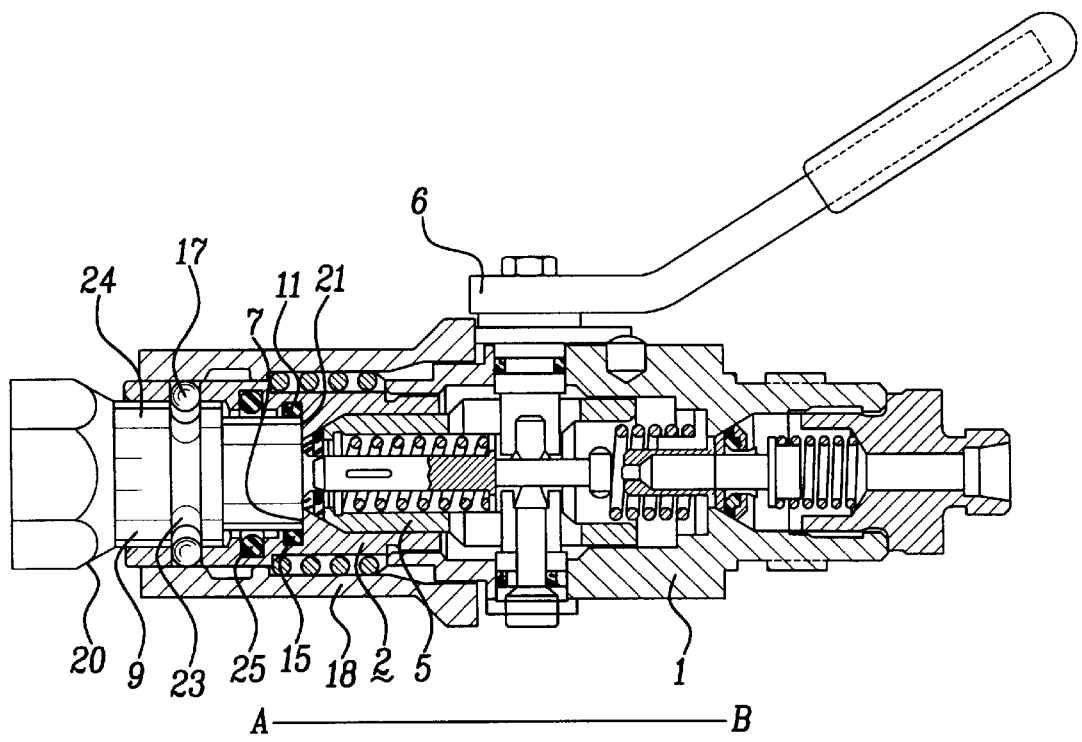
FIG. 2 is a cross-sectional view of a coupling plug in the form of a so-called flat plug associated with the coupling sleeve.

In the case of the embodiment shown in FIG. 2, the projection of the valve of the coupling plug 20 is positioned within the coupling plug 20. The projection does not project beyond its end face 21. In the case of the two above-mentioned embodiments of a coupling plug, it is assumed that the operation of inserting the coupling plug into the receiving chamber 4 of the coupling sleeve 2 always takes place in the closed position. Thus, the valve 5 is in the closed position and the medium cannot flow. The switching pin 8 does not extend into the receiving chamber 4.

A special advantage of the coupling plug 20, in the form of a flat plug according to FIG. 2, is as follows. During the uncoupling operation, when displacing the setting bush 18 towards the left after the actuating means 6 has been transferred into the closed position, the coupling plug 20 can also be moved in direction A out of the receiving chamber 4. A small, if any, quantity of leakage oil escapes because the dead space between the end face 21 of the coupling plug 20 and the end face 7 and between the switching pin 8 and the valve plate of the valve 5, respectively, is close to zero. As the second sealing ring 15, which becomes effective when uncoupling the coupling plug 20, is arranged close to the end face 7 of the receiving chamber 4, which means that the dead space is extremely small, it is impossible for a compression rate to occur which would obstruct the coupling operation.

Figure 4:
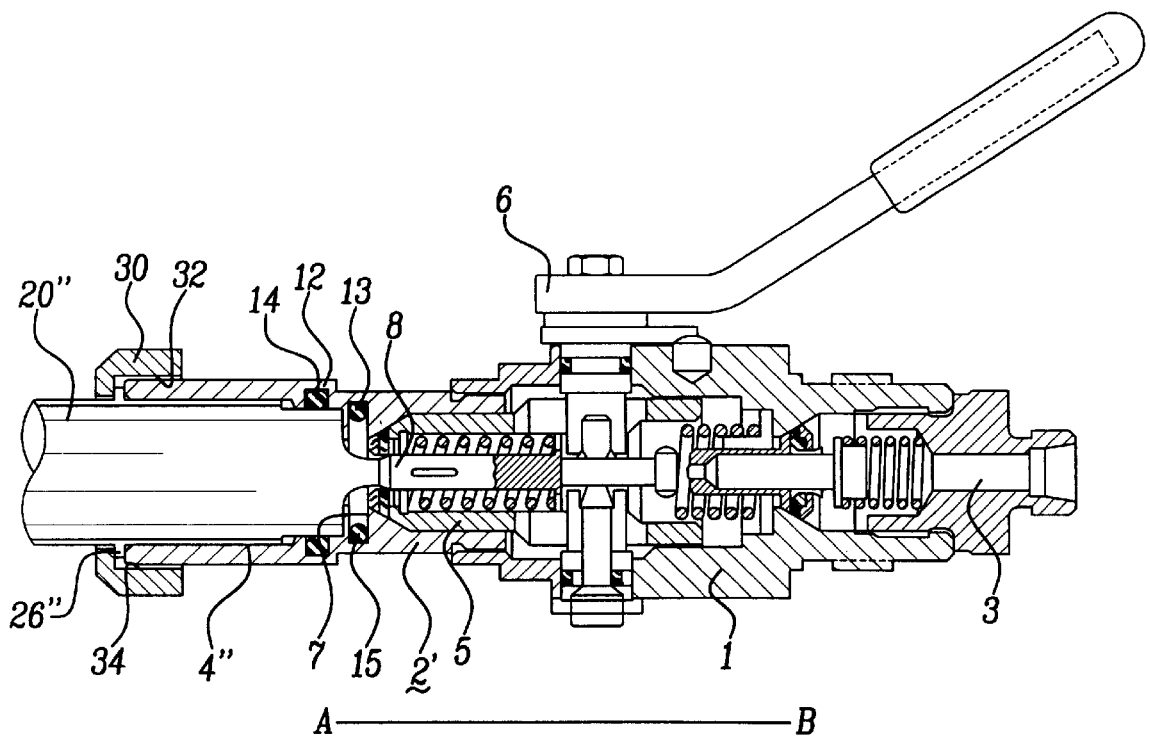
FIG. 4 is a cross-sectional view of a coupling plug in accordance with an additional embodiment of the present invention.

FIG. 4 illustrates a valve like that of FIG. 1 with the same reference numerals identifying the same parts. In FIG. 4, a union nut 30 is secured with the coupling sleeve 2'. Coupling sleeve 2' includes a thread 32 which engages the thread 34 of the union nut 30. Also, a coupling plug 20" includes a bead member 26' which secures the coupling plug 20' with the housing 2'. The coupling plug 20" is sealed with the sealing ring 14.

While the above detailed description describes the preferred embodiment of the present invention, the invention is susceptible to modification, variation and alteration without deviating from the scope and fair meaning of the subjoined claims.

I claim:

1. A coupling sleeve for receiving a coupling plug which, together, form a hydraulic coupling and serve to connect two hydraulic pipes, comprising:

a coupling sleeve connected to a housing, a receiving chamber in said sleeve for receiving and securing a coupling plug;

a valve movable to an open position for establishing a connection with the receiving chamber, said valve associated with said housing;

sealing means for achieving a sealing effect relative to the coupling plug, said sealing means associated with said receiving chamber;

said receiving chamber designed to receive, alternatively, at least two different coupling plugs, said sealing means including a separate sealing element for each coupling plug, each sealing element being of a size different from the other sealing element, such that each sealing element seals only one of the different coupling plugs.

2. A coupling sleeve according to claim 1, said sealing elements are provided in the form of sealing rings.

3. A coupling sleeve according to claim 1, wherein the receiving chamber includes axially spaced receiving grooves for receiving the sealing elements.

4. A coupling sleeve according to claim 1, wherein the sealing elements seal different diameters.

5. A coupling sleeve according to claim 1, wherein engaging balls are loadable by a setting bush for securing a coupling plug, said balls and bush associated with said sleeve.

6. A coupling sleeve according to claim 1, wherein the coupling plug is securable by a union nut.

\* \* \* \* \*